United States Patent
Santhanam et al.

[11] Patent Number: 5,188,489
[45] Date of Patent: Feb. 23, 1993

[54] COATED CUTTING INSERT

[75] Inventors: Anakkavur T. Santhanam, Monroeville; Rajendra V. Godse, Greensburg, both of Pa.

[73] Assignee: Kennametal Inc., Latrobe, Pa.

[21] Appl. No.: 708,422

[22] Filed: May 31, 1991

[51] Int. Cl.$^5$ .......................... B23C 5/20; B23B 27/16
[52] U.S. Cl. ...................... 407/119; 51/295; 427/249
[58] Field of Search ............... 407/119; 427/249; 51/295, 309

[56] References Cited

U.S. PATENT DOCUMENTS

| | | | |
|---|---|---|---|
| 2,356,009 | 8/1944 | Schwarzkopf | 407/119 |
| 4,643,620 | 2/1987 | Fujii et al. | 407/119 |
| 4,830,886 | 5/1989 | Cho et al. | 427/249 |
| 4,942,097 | 7/1990 | Santhanam et al. | 75/230 X |
| 4,966,501 | 10/1990 | Nomura et al. | 407/119 |
| 4,984,940 | 1/1991 | Bryant et al. | 407/119 |

FOREIGN PATENT DOCUMENTS

| | | | |
|---|---|---|---|
| 1-83310 | 7/1989 | Japan | |
| 411321 | 6/1934 | United Kingdom | 407/119 |

OTHER PUBLICATIONS

N. Sugaya et al., "Einsatz von Hartmetallen mit CVD-Mehrfacheschichtungen beim Frasen von Gusseisen in der Fertigung," VDI Berichte 762—Schneidstoffe und Werkzeuge, VDI-Verlag GmbH (1989), pp. 211-220.
P. Schwarzkopf et al., "Cemented Carbides," The MacMillan Co., (1960) pp. 166-176.
Tools A-D.
Tools E.
"Mill with Coated Inserts ? Sure!" Modern Machine Shop, Oct. 1987, pp. 52-59.

*Primary Examiner*—Steven C. Bishop
*Attorney, Agent, or Firm*—John J. Prizzi

[57] ABSTRACT

A coated indexable cutting insert for wet and dry milling of cast irons is provided. The substrate of the insert is composed of a cemented tungsten carbide based composition containing about 5.7 to about 6.4 weight percent cobalt and about 2.9 to about 3.6 weight percent tantalum. The coating includes two coatings of differing composition. The first coating is selected from titanium carbide, titanium carbonitride, and titanium nitride. The second coating is alumina.

21 Claims, 1 Drawing Sheet

COATED CUTTING INSERT

BACKGROUND OF THE INVENTION

The present invention relates to coated cutting tools. It especially relates to those coated cutting tools having a refractory coating bonded to a cemented tungsten carbide based substrate.

In the past, a variety of coated and uncoated cemented carbide indexable cutting inserts have been used to mill cast irons under wet conditions. Various uncoated cemented carbide grades have excellent thermal shock resistance in wet milling of cast irons, but because they lack a refractory coating they have relatively low wear resistance. Refractory CVD (chemical vapor deposited) alumina and titanium carbide coated cemented carbide grades have relatively high wear resistance but because of the cracks in their coatings they have a susceptibility to thermal shock and chipping during wet milling of cast irons.

Refractory PVD (physical vapor deposited) coated cemented carbide grades have better chipping resistance than that of refractory coated CVD cemented carbide grades. However refractory PVD alumina and titanium carbide coated cemented carbide grades are not commercially available. The available PVD titanium nitride and titanium carbonitride coated cemented carbide grades have a wear resistance in between that of the refractory CVD alumina and titanium carbide coated grades and uncoated grades.

From the above, it can be seen that there is a need for a refractory coated cemented carbide grade having a combination of wear resistance, thermal shock resistance and chipping resistance during the wet milling of cast irons.

SUMMARY OF THE INVENTION

The present inventors believe that the invention disclosed herein provides an answer to the foregoing need. In accordance with the present invention a cutting insert is provided having a rake face and a flank face at the junction of which is provided a cutting edge useful for the wet and dry milling of cast irons. The insert has a coating adherently bonded to a substrate. The substrate is a cemented tungsten carbide based composition having about 5.7 to about 6.4 weight percent (w/o) cobalt and about 2.9 to 3.6 weight percent tantalum. The tantalum is preferably present in the composition as tantalum-tungsten carbide. The coating has two coating layers: a first coating bonded to the substrate, is selected from titanium carbide, carbonitride and nitride, but is preferably titanium carbonitride; and a second coating, which is alumina, bonded to the first coating.

Preferably the average thickness of the first coating is about 1 to 3 micrometers ($\mu$m) and, preferably the average thickness of the second coating is about 0.5 to 2 $\mu$m. Preferably, the overall thickness of the coating is about 2 to 5 $\mu$m.

These and other aspects of the present invention will become more apparent upon review of the drawings, which are briefly described below, in conjunction with the following detailed description of the invention.

DETAILED DESCRIPTION OF THE INVENTION

Figure 1:
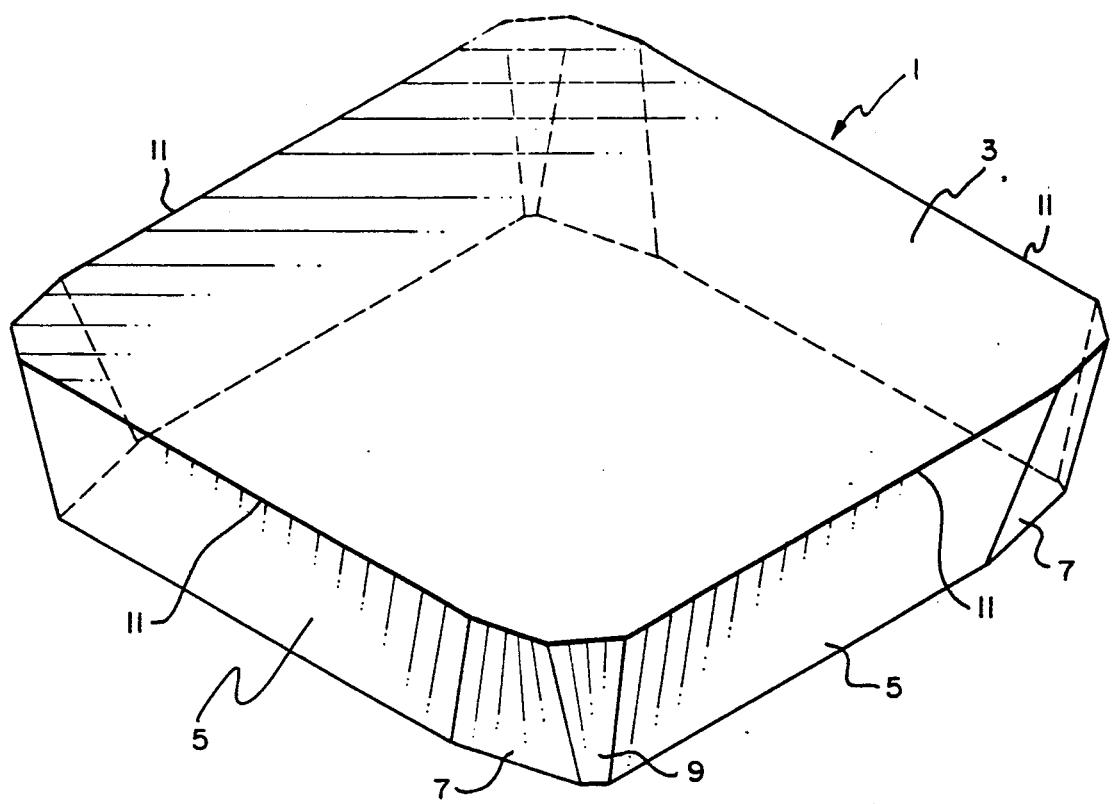
FIG. 1 shows an isometric view of an embodiment of an indexable cutting insert in accordance with the present invention.

An embodiment of an indexable cutting insert 1 in accordance with the present invention is shown in FIG. 1. The indexable cutting insert 1 has a rake face 3 and flank faces 5, 7 and 9. At the junction of the rake face and flank faces, cutting edges 11 are formed. Preferably the cutting edge 11 is in a honed condition.

The insert is composed of a cemented tungsten carbide substrate having a refractory coating thereon. The coating is adherently bonded to the substrate as a natural result of the elevated temperature coating process used to deposit the coating.

The cemented tungsten carbide based substrate contains about 5.7 to about 6.4 w/o cobalt and about 2.9 to 3.6 w/o tantalum. The tantalum is preferably and typically present as a tantalum tungsten carbide. Preferably the substrate has less than about 0.5 w/o of titanium and less than about 0.3 w/o niobium. Preferably the hardness of the substrate is about 91.6 to about 92.2 Rockwell A. The magnetic coercive force is preferably between about 190 to about 250 (Oersted) and the substrate preferably has a magnetic saturation value between about 80 to about 92 percent.

The average grain size of the substrate is preferably between about 1 to about 6 $\mu$m. The maximum apparent porosity of the substrate is preferably A06 without the presence of B or C type porosity. Preferably the substrate further has a nominal average transverse rupture strength (before coating) of about 2100 (MPa).

The substrate is made by conventional cemented carbide blending, milling, and pill pressing and sintering techniques.

The substrate grade described is a conventional grade that has been used in the past in an uncoated condition and in a coated condition for wet cast iron milling. In the coated condition the coating consisted of a thick (24 $\mu$m) first coating of TiC and a second, 1 to 4 $\mu$m thick coating of alumina. In the coated condition this grade was susceptible to early chipping of the cutting edge during wet milling of cast iron. In the uncoated condition the inserts had relatively low wear resistance.

The present inventors have now found that when the aforementioned substrate is combined with the following coating an enhanced combination of properties is provided during wet milling of cast iron. In the present invention a first coating is applied to the substrate which may be composed of titanium carbide, titanium carbonitride, titanium nitride or a combination thereof, preferably in an average thickness of about 1 to 3 $\mu$m. More preferably, the first coating is a single layer of titanium carbonitride since it has a hardness and wear resistance between titanium carbide and titanium nitride, but has a lower susceptibility to chipping compared to titanium carbide during wet milling of cast iron.

The application of the coating to the substrate should be controlled to minimize the formation of eta phase at the coating—substrate interface. The average thickness of eta phase found at the interface preferably should not exceed 2 $\mu$m and more preferably should not exceed 1 $\mu$m.

A second coating is adherently bonded to the first coating. The second coating is an alumina coating having an average thickness between about 0.5 to 2 μm and more preferably between about 1 to 2 μm. The total average coating thickness of the coating is preferably held between about 2 to about 5 μm.

The minimum coating thickness is preferred to provide a minimal level of wear resistance, while the maximum coating thickness assures that chipping resistance and thermal shock resistance are adequate.

The foregoing coatings are preferably applied by conventional CVD coating techniques used in the manufacture of cemented tungsten carbide metal cutting inserts.

The present invention will become more apparent upon consideration of the following examples which are provided purely for illustrative purposes only.

Cemented tungsten carbide based substrates are made using conventional processing techniques. The tungsten carbide substrates contain about 6.14 to 6.18 w/o cobalt, about 3.27 w/o tantalum, about 0.13 w/o titanium, about 0.04 w/o niobium and about 0.04 w/o iron. The substrates have an average magnetic coercive force, Hc, of about 209 Oersted, an average magnetic saturation of about 82%, a Rockwell A hardness of about 91.5 to 91.8. The density of the substrates is about 14.85 g/cc.

Two different coatings are applied by conventional CVD techniques to two groups of the above substrates. The first group of inserts receives a TiC-Al$_2$O$_3$ coating and the second group of inserts receives a TiCN-Al$_2$O$_3$ coating. The average thickness of the coatings is shown below along with the average thickness of the eta phase produced at the coating substrate interface.

TABLE I

|  | TiC/Al$_2$O$_3$ x ± 1 SD | TiCN/Al$_2$O$_3$ x ± 1 SD |
|---|---|---|
| eta phase | 1.6 ± 0.65 | 0.6 ± 0.16 |
| TiC | 2.1 ± 0.15 | — |
| TiCN | — | 2.7 ± 0.31 |
| Al$_2$O$_3$ | 0.6 ± 0.16 | 0.8 ± 0.17 |
| Total Coating | 2.7 ± 0.27 | 3.5 ± 0.28 | x = average thickness in um
1 SD = one standard deviation

The insert style produced is an SPKN-1203-EDR geometry which is shown in FIG. 1, having a 0.001 to 0.002 inch radius hone.

The inserts are subjected to a wet cast iron milling test described below.

TABLE II

| Coating | Tool Life (minutes) & Failure Mode |  |  | Average |
|---|---|---|---|---|
| TiC/Al$_2$O$_3$ | 24.5 mw | 59.5 ch | 28.2 fw | 37.4 |
| TiCN/Al$_2$O$_3$ | 30.1 mw | 38.9 ch | 36.1 mw | 35.0 |

Test Conditions

Flycut Milling Class 40 gray cast iron (190–220 BHN) 490 SFM (149.3 m/min.)/0.007 IPT (0.178 mm/tooth)/0.100 inch (2.54 mm) DOC with flood coolant.
Lead Angle: 15 degrees
Cutter Diameter: 4" (RA282.2-100-50 See Coromant Metalworking Products—Rotating Tools and Inserts Catalogue No. CMP-88 (1988) p. 47.)
Width: 3"
Length: 24"
Type: Climb End of Tool Life Criteria:
fw —0.015" uniform flank wear
mw—0.030" maximum localized flank wear
dn—0.030" depth of cut notch
ch—0.030" chip
bk—breakage Based on the above results, the inventors believe that the TiCN/Al$_2$O$_3$ coating is preferred over the TiC/Al$_2$O$_3$ coating since its tool life was more consistent.

Figure 2:
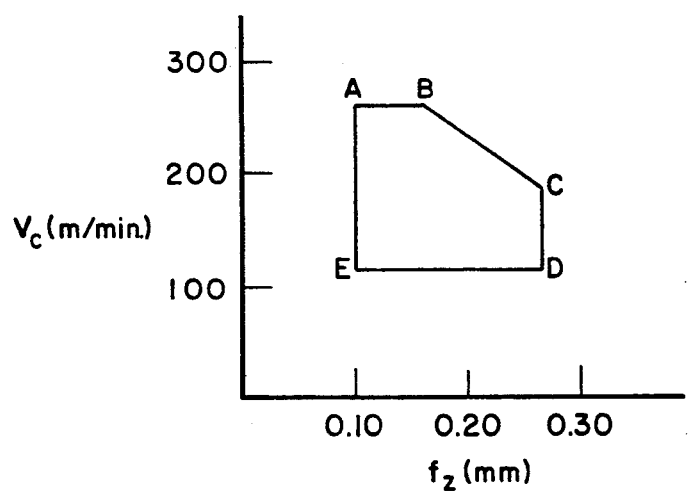
FIG. 2 shows a graph of a preferred application range of the present invention in the milling of cast iron as a function of speed (meters/minute) and feed (millimeters per insert).

The present invention may be used in both wet and dry cast iron milling. A preferred range of use in milling cast iron is shown in FIG. 2 as being within the shape defined therein by lines AB, BC, CD, DE and EA. Points A, B, C, D and E have the following approximate values.

|  | Feed (fz) mm | Speed (Vc) m/min |
|---|---|---|
| A | 0.1 | 260 |
| B | 0.16 | 260 |
| C | 0.27 | 190 |
| D | 0.27 | 115 |
| E | 0.1 | 115 |

Further improvements may be achieved in the chipping resistance of the present invention through the addition of a PVD coating having compressive residual stresses outside of the last CVD coating layer as described in our copending U.S. patent application Ser. Nos. 583,889 and 583,544, both filed on Sept. 17, 1990. As described in application Ser. No. 583,544 additional improvements in chipping resistance may be achieved through the use of such a CVD/PVD coating in conjunction with a substrate having a peripheral layer enriched in cobalt. The aforementioned patent applications are hereby incorporated by reference.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A cutting insert for wet and dry milling of cast irons, comprising:
   a flank face;
   a rake face;
   a cutting edge at the juncture of said rake and said flank faces, for said wet and dry milling of cast irons;
   a substrate and a coating, wherein said coating is adherently bonded to said substrate;
   a cemented tungsten carbide based composition forming said substrate;
   said cemented tungsten carbide based composition having
       about 5.7 to about 6.4 weight percent (w/o) cobalt,
       about 2.9 to about 3.6 w/o tantalum, wherein tantalum is present as a tantalum-tungsten carbide;
   said coating having a first coating of titanium carbonitride;
   a second coating of alumina;
   and wherein the total average thickness of the coating is about 2 to 5 μm.

2. The cutting insert according to claim 1 wherein said titanium carbonitride has an average thickness between about 1 and 3 μm.

3. The cutting insert according to claim 2 wherein said alumina has an average thickness between about 0.5 and 2 μm.

4. The cutting insert according to claim 1 wherein said coating consists of: said first coating of said titanium carbonitride adjacent to and adherently bonded to said substrate; and said second coating of said alumina adjacent to and adherently bonded to said first coating.

5. The cutting insert according to claim 1 wherein said substrate has a magnetic coercive force between about 190 and about 250 Oersted.

6. The cutting insert according to claim 1 wherein said substrate has a magnetic saturation value of about 80 to about 92 percent.

7. The cutting insert according to claim 1 wherein said substrate has a magnetic saturation value of about 80 to less than 90 percent.

8. The cutting insert according to claim 1 wherein said substrate has a magnetic saturation value of 80 to less than 88 percent.

9. The cutting insert according to claim 1 wherein said substrate has a magnetic saturation value of about 80 to 87 percent.

10. A cutting insert for wet and dry milling of cast irons, comprising:
a flank face;
a rake face;
a cutting edge at the juncture of said rake and said flank faces, for said wet and dry milling of cast irons;
a substrate and a coating wherein said coating is adherently bonded to said substrate;
a cemented tungsten carbide based composition forming said substrate;
said cemented tungsten carbide based composition having
about 5.7 to about 6.4 w/o cobalt, about 2.9 to about 3.6 w/o tantalum, wherein tantalum is present as tantalum tungsten carbide;
said coating having a first coating of titanium carbide having a thickness of about 1 to about 3 μm;
and a second coating of alumina;
wherein the overall coating thickness is about 2 to about 5 μm.

11. The cutting insert according to claim 10 wherein said coating consists of: said first coating of said titanium carbide adjacent to and adherently bonded to said substrate; and said second coating of said alumina adjacent to and adherently bonded to said first coating.

12. The cutting insert according to claim 10 wherein said substrate has a magnetic coercive force between about 190 to about 250 Oersted.

13. The cutting insert according to claim 10 wherein said substrate has a magnetic saturation value of about 80 to about 92 percent.

14. The cutting insert according to claim 10 wherein said substrate has a magnetic saturation value of about 80 to 87 percent.

15. A cutting insert for wet and dry milling of cast irons, comprising:
a flank face;
a rake face;
a cutting edge at the juncture of said rake and flank faces, for said wet and dry milling of cast irons;
a substrate and a coating wherein, said coating is adherently bonded to said substrate;
a cemented tungsten carbide based composition forming said substrate;
said cemented tungsten carbide based composition consistently essentially of
about 5.7 to about 6.4 weight percent (w/o) cobalt,
about 2.9 to about 3.6 w/o tantalum, wherein tantalum is present as tantalum-tungsten carbide;
less than about 0.5 w/o titanium, and less than about 0.3 w/o niobium;
and said substrate is characterized by
a hardness of about 91.6 to about 92.2 Rockwell A,
a magnetic coercive force between about 190 to about 250 Oersted,
and a magnetic saturation value between about 80 to about 92 percent;
said coating consisting essentially of
a first coating of titanium carbonitride adjacent to and adherently bonded to said substrate and having an average thickness between about 1 and 3 μm,
a second coating of alumina adherently bonded to said first coating, and having an average thickness between about 0.5 and 2 μm;
and wherein said coating has a total average thickness of about 2 to 5 μm.

16. The cutting insert according to claim 15 where said magnetic saturation value is about 80 to less than 90 percent.

17. The cutting insert according to claim 15 wherein said magnetic saturation value is 80 to less than 88 percent.

18. The cutting insert according to claim 11 wherein said magnetic saturation value is about 80 to 87 percent.

19. A cutting insert for wet and dry milling of cast irons, comprising:
a flank face;
a rake face;
a cutting edge at the juncture of said rake and said flank faces, for said wet and dry milling of cast irons;
a substrate and a coating, wherein said coating is adherently bonded to said substrate;
a cemented tungsten carbide based composition forming said substrate;
said cemented tungsten carbide based composition having
about 5.7 to about 6.4 weight percent (w/o) cobalt,
about 2.9 to about 3.6 w/o tantalum, wherein tantalum is present as tantalum tungsten carbide;
said coating having a first CVD coating of titanium carbonitride;
a second CVD coating of alumina;
and wherein said substrate has a magnetic saturation value of about 80 to less than 90 percent.

20. The cutting insert according to claim 19 wherein said magnetic saturation value is about 80 to less than 88 percent.

21. The cutting insert according to claim 19 wherein said magnetic saturation value is about 80 to 87 percent.

* * * * *